United States Patent [19]

Burgess

[11] 4,169,419
[45] Oct. 2, 1979

[54] FERTILIZER DISTRIBUTOR
[75] Inventor: Roland A. Burgess, Courtland, Va.
[73] Assignee: Union Camp Corporation, Wayne, N.J.
[21] Appl. No.: 913,097
[22] Filed: Jun. 6, 1978
[51] Int. Cl.² .................... A01C 11/00; A01C 15/00
[52] U.S. Cl. ............................................. 111/2; 111/3; 111/73; 111/80; 222/179; 222/288; 222/370
[58] Field of Search ................ 111/2, 98, 3, 50, 73, 111/72, 80; 221/265; 222/179, 288, 370, 284, 289, 305

[56] References Cited

U.S. PATENT DOCUMENTS

| 435,750 | 9/1890 | Holselaw | 222/288 X |
|---|---|---|---|
| 460,010 | 9/1891 | Hackett | 111/98 |
| 519,460 | 5/1894 | Stevens et al. | 111/80 |
| 874,072 | 12/1907 | Holl | 222/179 X |
| 959,852 | 5/1910 | Gordon | 222/179 X |
| 977,115 | 11/1910 | Markley | 222/370 X |
| 1,091,163 | 3/1914 | Reading | 222/179 X |
| 1,523,348 | 1/1925 | Pegrim | 111/3 |
| 1,787,538 | 1/1931 | Boeus et al. | 111/3 X |
| 1,806,050 | 5/1931 | Fischer | 222/179 X |
| 2,299,565 | 10/1942 | Colburn | 222/370 X |
| 2,738,903 | 3/1956 | Henry et al. | 222/370 X |
| 3,265,251 | 8/1966 | Lense | 222/370 X |
| 4,003,500 | 1/1977 | Schornig | 222/288 X |

FOREIGN PATENT DOCUMENTS 1303147  7/1962  France .................................. 222/370

Primary Examiner—Paul T. Sewell
Assistant Examiner—Steven A. Bratlie
Attorney, Agent, or Firm—Kane, Dalsimer, Kane, Sullivan and Kurucz

[57] ABSTRACT

A fertilizer distributor adapted to be combined with a tree seedling planter which gives the operator complete control of spacings by a foot pedal mechanism that allows him to dump the desired amount of fertilizer along the bases of seedlings being planted.

4 Claims, 7 Drawing Figures

U.S. Patent Oct. 2, 1979 Sheet 2 of 2 4,169,419
Fig.2
Fig.7
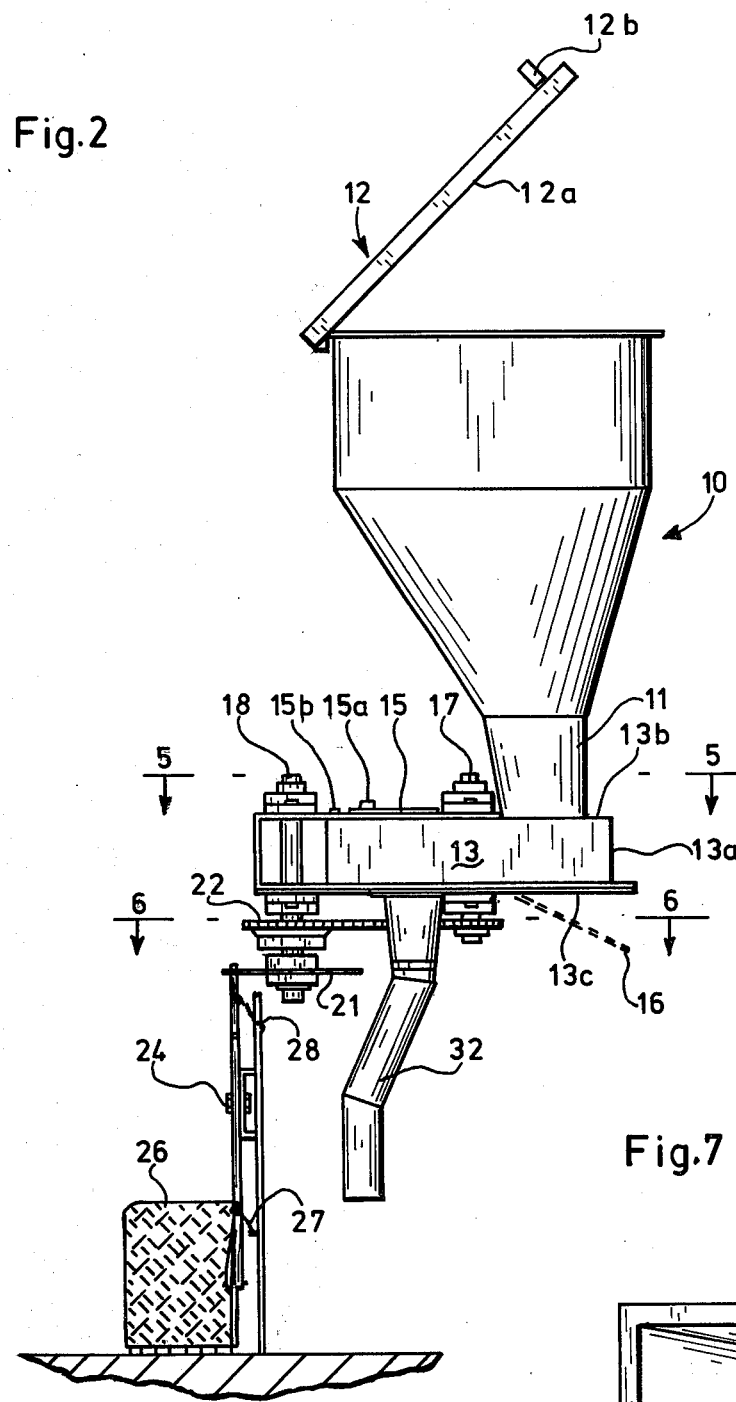
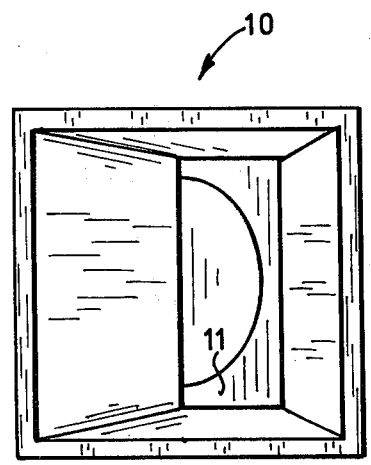

FERTILIZER DISTRIBUTOR

BACKGROUND OF THE INVENTION

1. Field of the Invention

The invention relates to fertilizer distributors and more particularly to a distributor which can be attached to a seedling planter so that the operator can dispense the desired amount of fertilizer along the base of each seedling being planted.

2. Brief Description of the Prior Art

The prior art shows a number of patents which disclose fertilizer distributors and dispensing devices (U.S. Pat. Nos. 2,123,223; 2,371,958; 833,594; 959,852; 1,252,802; 2,193,235 and 3,879,888). Other patents disclose combination planters and fertilizers (U.S. Pat. Nos. 460,010; 522,367; and 1,490,770). However, the structure of the present invention, which is adapted to be used in combination with a tree seedling planter, is an improvement over the devices of the prior art and has certain features which make it particularly suitable for applying fertilizer along the bases of seedlings being planted.

SUMMARY OF THE INVENTION

A combination fertilizer distributor and tree seedling planter in which the distributor comprises a hopper to hold the fertilizer;

a rotatable discharge wheel provided with a plurality of spaced tubes around the circumference of the wheel which tubes are adapted to receive cylindrical or cone shaped inserts which inserts can be changed to permit calibration of the amount of fertilizer to be discharged from each tube or insert;

a spring loaded pedal mechanism connected to the discharge wheel to move the wheel one notch each time the pedal is depressed, which mechanism permits the operator to dump a predetermined amount of fertilizer from the discharge wheel each time the pedal is pressed; and a drop chute positioned beneath the tube from which the fertilizer is to be discharged;

the fertilizer feeding from the hopper to the discharge wheel, with the weight of the fertilizer in the hopper resting on the discharge wheel to provide a braking action to stop the dispensing tube of the discharge wheel over the drop chute in the correct position on each movement of the wheel.

BRIEF DESCRIPTION OF THE DRAWINGS

In the drawings:

FIG. 2 is a rear elevation of the distributor of FIG. 1;

FIG. 7 is a top view of the distributor of FIG. 1.

DETAILED DESCRIPTION OF THE PREFERRED EMBODIMENTS OF THE INVENTION

Figure 1:
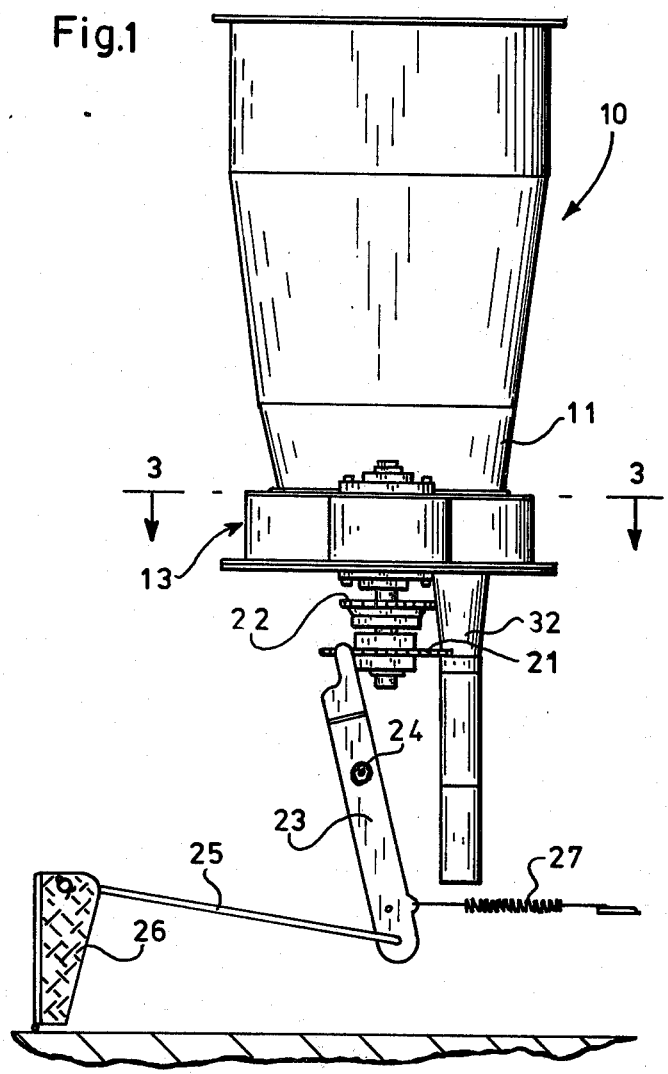
FIG. 1 is a side elevation of the distributor of the present invention.

Referring to the drawings, there is shown in FIGS. 1 and 2 a hopper 10 to hold the fertilizer to be distributed. Such hopper is made of suitable sheet material of a size for the capacity required. The sides of the bottom portion of the hopper are tapered to form a chute 11 and direct the free flowing fertilizer toward one side of a discharge wheel (FIG. 7). The hopper is provided with a hinged door 12 with downward extended edges 12a to prevent rain water and other extraneous materials from entering the hopper. A handle 12b assists in opening and closing the hopper door.

Figure 3:
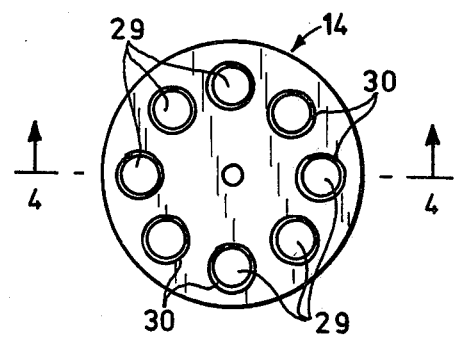
FIG. 3 is a sectional view along the line 3—3 of FIG. 1.
Figure 4:
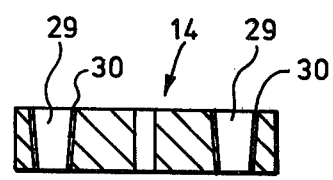
FIG. 4 is a sectional view along the line 4—4 of FIG. 3.
Figure 5:
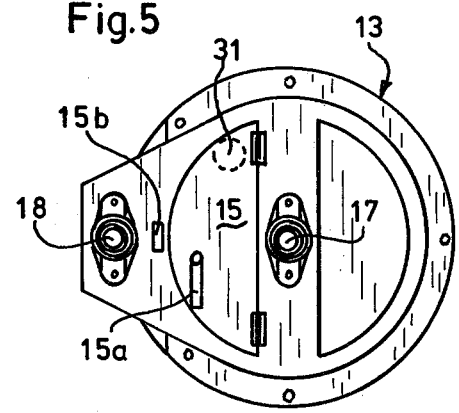
FIG. 5 is a sectional view along the line 5—5 of FIG. 2.
Figure 6:
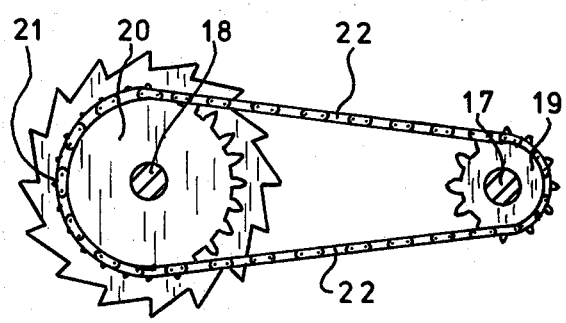
FIG. 6 is a sectional view along the line 6—6 of FIG. 2.

The hopper 10 is mounted over one end of a discharge wheel housing 13 (FIG. 5). Such housing is generally cylindrical in shape adapted to hold a discharge wheel 14 (FIGS. 3 and 4). The housing includes sides 13a, a top 13b and a base 13c, which base can be used to secure the housing to the frame of the distributor. The top 13b is provided with a top clean out door 15 hinged to the top, such door having a handle 15a and a latch 15b. The bottom 13b is also provided with a bottom clean out door 16 hinged to the bottom. These clean out doors in the upper front and lower rear of the discharge wheel help to control build up of fertilizer under damp weather conditions. Passing through the center of the housing with suitable mountings is a first shaft 17 on which is mounted the discharge wheel 14 so that such discharge wheel can rotate within the housing. Also passing through one side of the housing with suitable mountings is a second shaft 18. Secured to the first shaft 17 on the outside of the housing is a sprocket wheel 19. Secured to the second shaft 18 on the outside of the housing is a sprocket wheel 20 and a tooth engaging sprocket wheel 21. The sprocket wheels 19 and 20 are aligned and connected with a sprocket chain 22 so that rotation of the shaft 18 will rotate the shaft 17 and the discharge wheel 14 (FIG. 6). The sprocket wheels 19 and 20 are so sized and the teeth of the tooth engaging sprocket wheel 21 are so sized that rotation of the sprocket wheel one tooth will move the discharge wheel the proper distance to be hereinafter described.

A sprocket bar 23 is connected to an anchor swivel 24 secured to the frame of the distributor. One end of the sprocket bar 23 engages the teeth of the tooth engaging sprocket wheel 21 while the other end is connected to one end of a linkage rod 25. The other end of the linkage rod 25 is connected to a pedal 26 hinged to the frame. It will be seen in FIGS. 1 and 2 that pressure on the pedal 26 will move the linkage rod 25, sprocket bar 23, tooth engaging sprocket wheel 21, and finally the discharge wheel. Although the pedal 26 is shown as a foot pedal, it will be understood that similar linkage can be used to turn the tooth engaging sprocket wheel by hand. The sprocket bar 23 is spring loaded with engaging springs 27 and 28 connected to the frame so that the control mechanisms and pedal will return to their normal positions each time the foot pedal is released.

Referring to FIGS. 2, 3 and 4, the discharge wheel 14 mounted within the discharge wheel housing 13 is a cylinder having a plurality of open ended tubes 29 spaced around the circumference of the wheel. Such tubes may be tapered and adapted to receive cone shaped inserts 30 of any capacity so that the amount of fertilizer being discharged from the tube can be varied depending on requirements. In this way the amount of fertilizer can be calibrated. It will be understood that such tubes and the inserts may be cylindrical in which case some form of flange mount would be required.

The base 13c of the discharge wheel housing 13 (FIG. 5) is provided with a circular opening 31 through which the fertilizer can be discharged from the discharge wheel 14. Aligned with this opening 31 is a drop chute 32 through which the discharged fertilizer can be directed to the desired place on the ground.

In operation the fertilizer is placed in the hopper 10 and flows down through the bottom chute of the hopper into the opening on one side of the discharge wheel housing into the exposed empty tube or insert on one side of the discharge wheel. Such tubes will be provided with the proper size insert to insure the correct amount of fertilizer to be discharged from each tube. The operator depresses the pedal which moves the actuating gear one notch and rotates the discharge wheel from one tube to the next. Such rotation of the discharge wheel within its housing will bring the filled tube under the top of the housing which causes the fertilizer extending above the tube to be swept off so that such tube will now be filled approximately level with the top of the tube. As the operator successively depresses the pedal the tubes will move around within the discharge wheel housing until the filled tube arrives over the opening in the bottom of such housing. The weight of the fertilizer in the hopper resting on the discharge wheel acts as a braking action to stop the dispensing tube over the drop chute in the correct position on each movement. The fertilizer in the tube will then drop through the opening and drop chute aligned with such opening onto the ground.

The fertilizer distributor was designed to be used with an enclosed type planter now in use with the fertilizer being applied separately. The free hanging bottom with the top type suspension makes a cab or platform of some type necessary. It requires only a simple adaptation of the distributor to connect it to a separate unit.

It will be apparent that the fertilizer distributor of the present invention is adapted to combine the tree planting and initial fertilizing into a one pass operation to eliminate wasted time and fertilizer. It also serves to dispense the fertilizer so as to reap the greatest benefits from types and placement of fertilizer by proper spacing along the base of the seedling being planted.

Those skilled in the art will appreciate that many variations of the above described embodiment of the invention may be made without departing from the spirit and the scope of the invention.

What is claimed is:

1. A combination fertilizer distributor and tree seedling planter to plant one seedling at a time in which the distributor comprises:

a hopper to hold a quantity of fertilizer;

a rotatable discharge wheel provided with a plurality of spaced open ended tubes;

a plurality of cone shaped inserts;

each said tube being adapted to receive said cone shaped inserts whereby the inserts can be of different capacities and therefore changed to permit calibration of the amount of fertilizer to be discharged from the tube;

a housing encasing said discharge wheel;

said housing having a top opening on one side of the housing positioned to permit fertilizer to feed from the hopper through the opening to fill the tubes on one side of the wheel and having a bottom opening positioned to permit fertilizer to discharge from one of the filled tubes;

tooth engaging sprocket wheel means interconnected to said discharge wheel to permit the operator to selectively move said sprocket wheel means one tooth at a time thereby successively bringing one filled tube at a time to said bottom discharge opening; and a spring loaded pedal mechanism, moveable by foot or by hand, linked to said sprocket wheel means whereby depressing the pedal by the operator will move said sprocket wheel means from one tooth to the next with the spring thereof returning said pedal to its original position whereby the filled tubes will be successively emptied, one tube at a time.

2. The distributor of claim 1 including a drop chute which is positioned beneath said bottom opening of said housing to direct fertilizer discharged through said bottom opening to the base of a seedling being planted wherein the fertilizer fed from the hopper and resting on the discharge wheel provides a slowing action to stop the dispensing tube of the discharge wheel in the correct position over the bottom opening of the housing and drop chute on each movement of the wheel.

3. The distributor of claim 1 wherein the top of the discharge wheel housing is provided with a top clean out door to take care of fertilizer build up in the housing and discharge wheel.

4. The distributor of claim 1 wherein the bottom of the discharge wheel housing is provided with a bottom clean out door to take care of fertilizer build up in the housing and discharge wheel.

* * * * *